United States Patent
Patel

(10) Patent No.: US 9,118,611 B2
(45) Date of Patent: Aug. 25, 2015

(54) DATA SYNCHRONIZATION FOR CIRCUIT RESOURCES WITHOUT USING A RESOURCE BUFFER

(75) Inventor: Jay Patel, Los Gatos, CA (US)

(73) Assignee: MoSys, Inc., Santa Clara, CA (US)

( * ) Notice: Subject to any disclaimer, the term of this patent is extended or adjusted under 35 U.S.C. 154(b) by 0 days.

(21) Appl. No.: 13/215,205

(22) Filed: Aug. 22, 2011

(65) Prior Publication Data

US 2012/0047260 A1 Feb. 23, 2012

Related U.S. Application Data

(60) Provisional application No. 61/375,469, filed on Aug. 20, 2010.

(51) Int. Cl.
*G06F 15/173* (2006.01)
*H04L 12/861* (2013.01)
*H04L 7/04* (2006.01)

(52) U.S. Cl.
CPC ............. *H04L 49/9057* (2013.01); *H04L 7/041* (2013.01)

(58) Field of Classification Search
CPC ... H04L 12/40013; H04L 7/041; H04L 69/32; H04L 69/323; H04L 69/324; H04L 49/9057
USPC .................. 709/214, 225, 227; 711/142, 154; 370/429, 439, 445; 375/356, 371, 376
See application file for complete search history.

(56) References Cited

U.S. PATENT DOCUMENTS

| 7,073,001 | B1* | 7/2006 | Kucharewski et al. ........ 710/105 |
| 2003/0043926 | A1 | 3/2003 | Terashima et al. |
| 2003/0061459 | A1 | 3/2003 | Aboulenein et al. |
| 2007/0286320 | A1* | 12/2007 | Jiang .............................. 375/371 |
| 2008/0109672 | A1* | 5/2008 | Godiwala et al. ............. 713/401 |
| 2008/0209303 | A1 | 8/2008 | Leung et al. |
| 2008/0298383 | A1* | 12/2008 | Wang ............................. 370/439 |
| 2008/0300992 | A1* | 12/2008 | Wang et al. ..................... 705/16 |
| 2010/0077083 | A1* | 3/2010 | Tran et al. ...................... 709/227 |
| 2010/0094098 | A1* | 4/2010 | Smith et al. .................... 600/300 |
| 2010/0313089 | A1* | 12/2010 | Rajski et al. ................... 714/731 |
| 2011/0188335 | A1 | 8/2011 | Roy et al. |
| 2011/0191548 | A1 | 8/2011 | Miller et al. |
| 2011/0191564 | A1 | 8/2011 | Roy |

OTHER PUBLICATIONS

De-Feng Liu et al.: "Multi-bank memory access scheduler and scalabiltiy," Computer Engineering and Technology (ICCET), 2010 2nd International Conference on, IEEE, Piscataway, JN, USA, Apr. 16, 2010, pp. V2-723, XP031689946, ISGN: 978-1-4244-6347-3.

* cited by examiner

*Primary Examiner* — Hitesh Patel

(57) ABSTRACT

A method of resource-synchronizing data that is transmitted on a communication link having at least one data lane, between a first device and a second device, wherein the second device has a resource that is accessible based on an access schedule. In one operation, a timing offset of the second device based on the access schedule is determined, followed by delaying the transmission of data from the first device to the second device through the communication link by an amount of time equal to the timing offset so that the data is received at the resource when the resource is accessible according to the access schedule.

20 Claims, 8 Drawing Sheets

DATA SYNCHRONIZATION FOR CIRCUIT RESOURCES WITHOUT USING A RESOURCE BUFFER

CROSS-REFERENCE TO RELATED APPLICATIONS

This application claims all rights and priority on prior U.S. provisional patent application Ser. No. 61/375,469 filed Aug. 20, 2010, which application is also incorporated by reference herein in its entirely.

FIELD

This invention relates to the design of integrated circuits. More particularly, this invention relates to a system for reducing data latency in chip to chip communication where one chip accesses resources within another chip.

BACKGROUND

The data lanes that make up a data interface between two devices, or chips, are called a data link. The different lanes in the data link are typically synchronized to the slowest lane. The different lanes on a receiving device receive data segments of a data frame at different times. However, a complete data frame is only transmitted from one layer to another after the last data word has arrived at the receiving device and the receiving device is then able to accept the data. This delay in transmission can cause latency in high-speed communications between devices. Depending upon the delay of individual data segments and the time at which the data frame was transmitted, the data frame might not be available for immediate use by the receiving device, and therefore would have to be stored until it can be used by the receiving device. This incurs additional undesirable latency.

For example, and with reference to FIG. 1, data is transferred over an interface link 104a or 104b from at least one first device 102 to a second device 106, such as a device that has some kind of internal resource 108. Timing offsets are determined between each lane of the link 104 and the lane of the link 104 containing the slowest arriving data, which determines when the frame is ready to be forwarded to the next layer. A serializer/deserializer 110 (SerDes) contains a buffer to hold data from the various lanes during this synchronization or deskewing process.

If, after the data is link-synchronized in the manner described above, the resource 108 is not accessible, then a resource buffer 109 is used to store the frame data until the resource 108 is able to accommodate the frame of data.

SUMMARY

In various embodiments, a resource synchronizer synchronizes transmission of data between devices so that a SerDes of the device receiving the data is capable of providing the data to a resource of the device without buffering the data between the SerDes and the resource. In this way, the resource synchronizer reduces latency in transmission of the data to the resource in comparison to a device using a resource buffer.

A method, in accordance with one embodiment, performs resource synchronization of data transmitted on a communication link between a first device and a second device. The communication link has at least one data lane. The second device has a resource that is accessible based on an access schedule. The method includes determining a timing offset based on the access schedule of the second device and communicating the timing offset to the first device. The method further includes delaying transmission of training sequence from the first device to the second device through the communication link by the timing offset so that the data is received at the resource when the resource is accessible according to the access schedule. Delaying the transmission of training sequence can be accomplished by scheduling the state machine of the device that is transmitting training sequence to add additional delay at the end of any given training sequence specified by the value of the sync offset prior to continuing with the next training sequence. An apparatus, in accordance with one embodiment, includes a SerDes, a resource synchronizer, and a memory. The memory is coupled to the SerDes. Moreover, the memory has an access schedule. The resource synchronizer is configured to determine a timing offset for delaying transmission of data to the SerDes so that the SerDes is capable of forwarding, or providing, the data to the memory according to the access schedule without the need for buffering the data between the SerDes and the memory.

An electronic communication system, in accordance with one embodiment, includes a first device and a second device. The first device is for communicating information. The second device is coupled to the first device through a communication link. The second device includes a SerDes and a resource coupled to the SerDes. The resource has an access schedule for accessing the resource. The second device in configured to determine a timing offset for delaying transmission of data from the first device to the second device so that the SerDes is capable of providing the data to the resource according the access schedule without the need for buffering the data between the SerDes and the resource.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

In various embodiments, a resource synchronizer synchronizes transmission of data to an input/output port, e.g., a SerDes, of a device so that the SerDes is capable of providing the data to a resource of the device without buffering the data between the SerDes and the resource.

In a high-speed interface according to various embodiments of the present invention, each lane on the receiver side independently aligns itself to an incoming training sequence. Each lane in the link has the ability to tolerate a skew of some number of unit intervals between the earliest and the latest arriving lane of a link. The slowest lane, being the lane with the latest arriving sync word, establishes a sync target. If the link is attempting to maintain minimum latency, all lanes within a link should align to the sync target. All lanes except the slowest lane have their sync word delayed by the number of clock cycles that is needed to align their respective words to the sync target. This alignment is achieved with deskew buffers and a global state machine.

Figure 2:
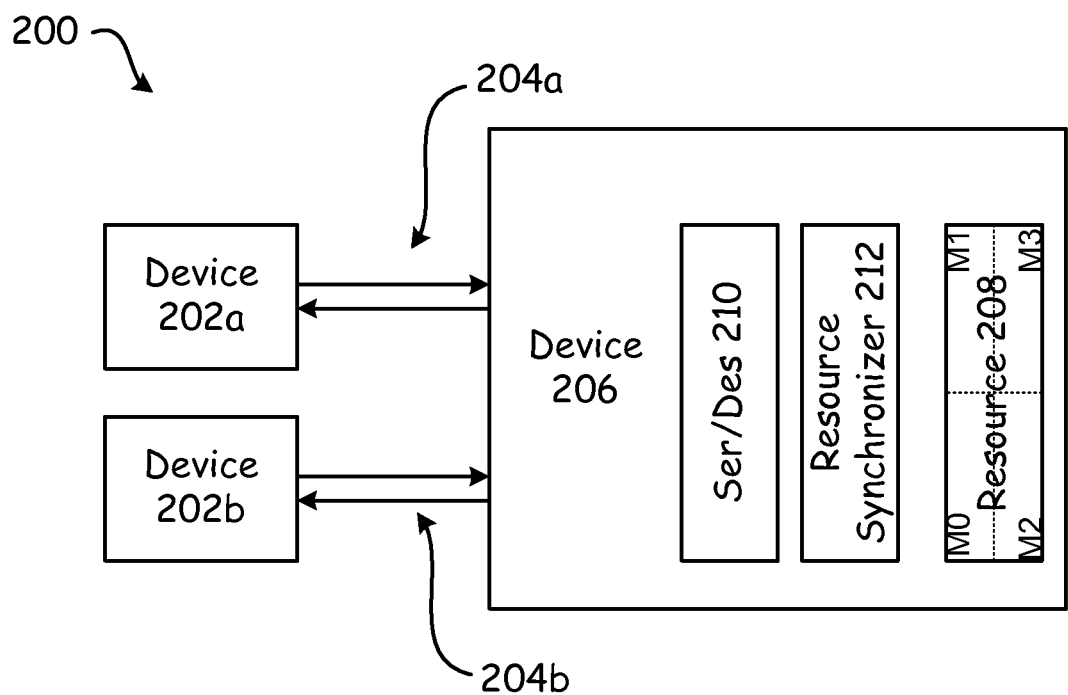
FIG. 2 is a functional block diagram of an electronic communication system, according to an embodiment of the present invention.

FIG. 2 illustrates an electronic communication system 200, in accordance with an embodiment of the present invention. The various embodiments of the present invention synchronize the transfer of data over data links 204a and 204b (i.e., communication links) from devices 202a and 202b (e.g., transmitters), either one or both of which can be a device such as an application specific integrated circuit, a field programmable gate array, a central processing unit, a macro, other such devices, or any combination thereof, to a device 206 (e.g., a receiver), such as a system on a chip that includes one or more resources 208, such as a memory, central processing unit, field programmable gate array, macro, other such devices, or any combination thereof. As depicted in FIG. 2, the resource 208 can represent multiple resources 208a, 208b, 208c, and 208d, or a single resource 208 with multiple partitions M0-M3.

In one embodiment, device 206 is a bandwidth engine with resource 208 coupled to resource synchronizer 212 and SerDes 210. Resource 208 of bandwidth engine 206 is memory partitioned into four partitions, M0-M3. Resource synchronizer 212 includes a controller to perform the synchronization operations hereinafter. Additionally, bandwidth engine 206 includes an arithmetic processing unit for performing algorithms on data.

In various embodiments, the device 206 receives data transmitted across one or more data links 204 (e.g., data links 204a and 204b). For example, the data may be serial data, such as a serial data stream. The SerDes 210 performs a link synchronization on the data, as is described more fully herein. The resource synchronizer 212 performs a resource synchronization on the data, as is also described more fully herein. In some embodiments, the data link 204 includes a number of data lanes, e.g. one to eight data lanes in one embodiment, each of which transmits a portion of the data across the data link 204. In these embodiments, the SerDes 210 deskews the data received across the data link 204 by aligning the portions of the data received at the device 206, as is described more fully herein.

Figure 1:
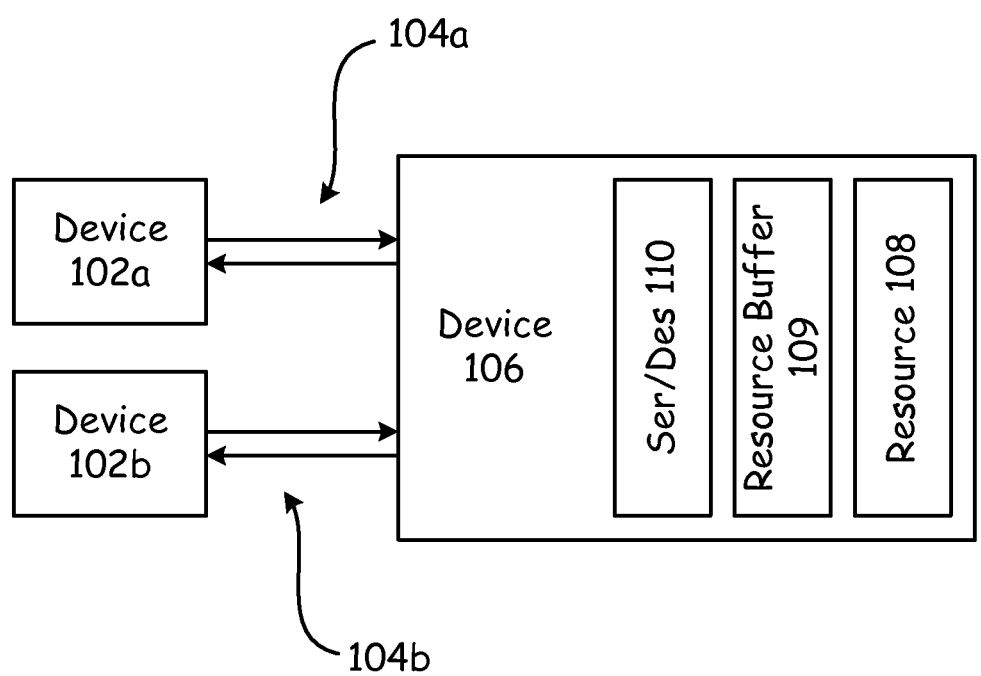
FIG. 1 is a functional block diagram of devices communicating across their respective communication links, according to the prior art.

As described above, the first step is to deskew the data received across lanes 204, such as by using the SerDes 210. At this point, the data is link-synchronized, as described above. However, according to the embodiments of the present invention, the device 206 does not have a buffer 109, as shown in FIG. 1, between the SerDes 210 and the resource 208 to store the data until the resource 208 can receive the data. Instead of using a buffer 109 to store the data until the resource 208 can receive the data, another method is used, which method generally tends to reduce the latency inherent in the communication between the devices 202 and the resource 208. The method employs the resource synchronizer 212 to perform a resource synchronization on the data, which does not buffer the data in a buffer 109, and thus removes the latency associated with the buffer 109 in the prior art.

An exemplary embodiment is presented where the device 202 is an ASIC, the device 206 is a system on a chip, and the system on a chip 206 has a memory as the resource 208. However, it is understood that this is by way of example only, and the actual devices and components can be those such as described above.

Figure 3:
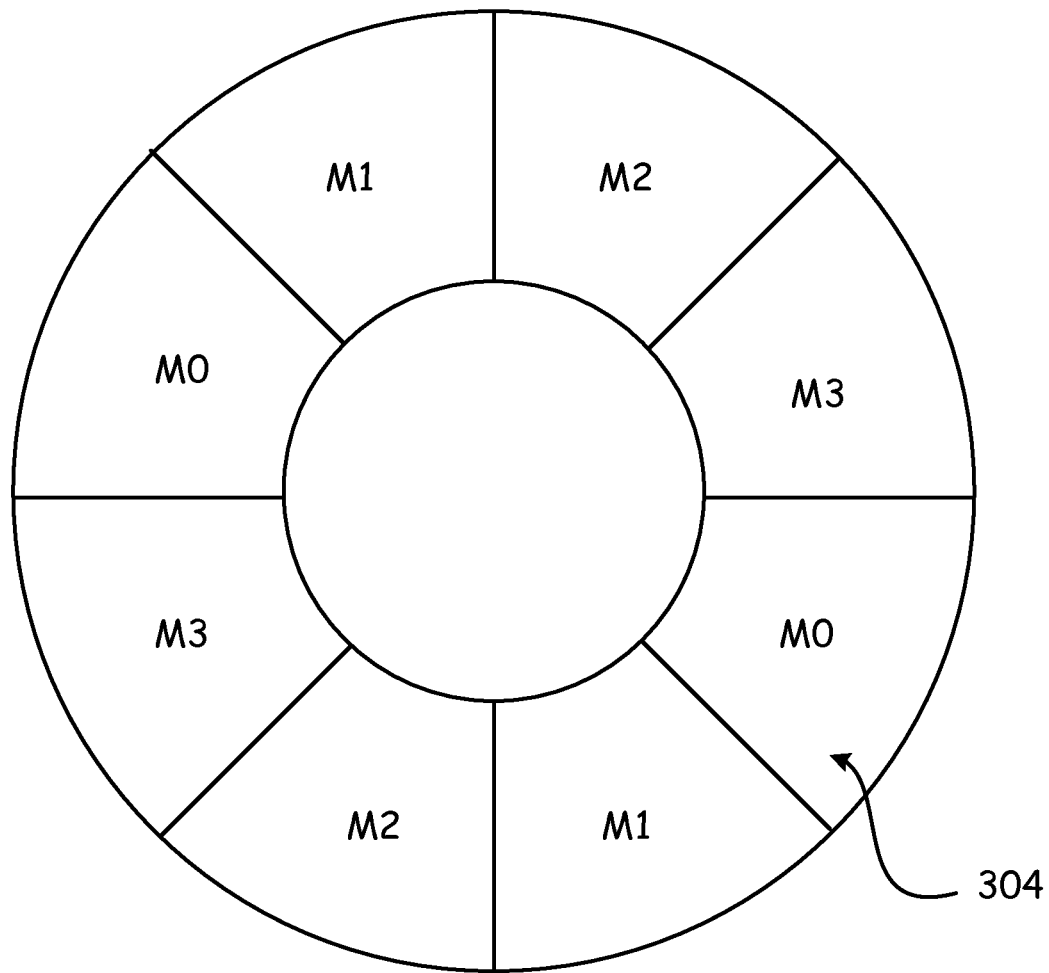
FIG. 3 is a logical representation of a control logic that provides access to different portions of a resource according to a rotating schedule, according to an embodiment of the present invention.

The memory 208 on the system on a chip 206 has multiple partitions that operate at a given frequency, such as 250 megahertz (for example). To circumvent the timing constraints of each partition, the resource synchronizer 212 includes a scheduler (or wheel) 302 as depicted in FIG. 3 to increase the speed of the system chip 206 to one gigahertz (for example). The purpose of the scheduler 302 is to synchronize the timing of the memory 208 to the timing of the devices 202. When the timing of the memory 208 is synchronized to the timing of the devices 202, the communication over the data link 204 is enhanced, and no buffer 109 is required.

The partitions on the scheduler 302 represent the portions of the resource 208 that are available for access at a given point in time, as shown in FIG. 2 as partitions M0-M3. It is appreciated that the scheduler 302 can be configured in a variety of different ways. As depicted, the scheduler 302 rotates through two series of four partitions in eight cycles. However, this is only by way of example, and not by way of limitation. Other embodiments include a greater or lesser number of partitions and one or many series within a cycle. Thus, partitions of two through P in number and series of one through S in number are contemplated herein.

Thus, partitions on the scheduler 302 represent access restrictions on the resource 208. The device 206 of the exemplary embodiment restricts access to each of the four partitions of the memory 208 to specific cycles. Generally, when access to a specific partition on the memory 208 is available on some fixed cycle, such as for example once every two cycles or once every four cycles, then an access request to that partition must be timed, or synchronized, between the two devices, e.g., 202 and 206, in order to minimize the latency in completing the access request. The manner in which this request is timed, such that latency is reduced, is one improvement provided by the embodiments of the present invention.

The scheduler 302 is used to schedule accesses to the partitions of the memory 208 of the system on a chip 206. The scheduler 302 can schedule two or more concurrent accesses to the same partition of the memory 208 as long as an address conflict within the partition of the memory 208 is avoided. The scheduler 302 advances (e.g., the wheel 302 rotates) when a given partition of the memory 208 is available to receive a data frame. For example, for a memory 208 having four partitions M0, M1, M2, and M3, the scheduler 302 could have the sequence as given in FIG. 3 At position 304, which is the start of the M0 cycle, if a command for the first partition is not available, then M0 is not accessed, and the scheduler 302 advances to the next partition in the sequence (e.g., the scheduler 302 continues to rotate over time). During training, the device 202 repeatedly sends out a training pattern that includes a sync word of data on each data lane of the data link 204. The ASICs 202 send out their sync words independently of one another, and at an arbitrary start time. The SerDes 210 receives the training patterns and determines a sync target based on the training patterns.

After the sync target is determined, the SerDes 210 stores sync words in each lane until each sync word lines up to the sync of the slowest lane, the sync target, using the deskew buffers on receiving device 206. Additionally, the resource synchronizer 212 (e.g., global state machine) determines where the sync target transmitted by the device 202 (e.g., transmitter) are with respect to the desired partition, e.g., M0, on the scheduler 302. If the alignment of the sync target does not match that of the desired resource partition, e.g., M0, then the system on a chip 206 transmits an adjustment for the sync word to the ASIC 202. In this way, the device 206 performs a resource synchronization on the data.

Without the resource-synchronization described above, link-synchronized data might arrive at the device 206 at a time period where M0 of the resource 208 is accessible, but the data that arrives is intended for partition M3, because the device 202 does not know the access schedule for the resource 208. If the partition M3 of the resource 208 is not accessible, the link-synchronized data would have to be placed in the buffer 109, according to the prior art design, to wait until M3 is accessible, otherwise the data would be lost. Thus, even though the data was link-synchronized, it was not resource-synchronized, and had to be buffered, adding to the latency in the communication of the system. Further, because the prior art system has to be configured with a buffer 109 of FIG. 1 to handle situations such as these, the data is always placed in the buffer 109, even if it happens to arrive at the proper time. Thus, these prior art systems increase latency even when it is not necessary to do so, because of their architecture.

The embodiments of the present invention, by contrast, add resource-synchronization to the system 200 with the resource synchronizer 212. The resource synchronizer 212, as described herein, communicates the resource schedule represented by the partitions of the scheduler 302 to the devices 202, so that they can be trained not only with link-synchronization but also with resource-synchronization. In this manner, the devices 202 know to send data intended for partition M0 at a time when it will arrive at the device 206 when partition M0 of the resource 208 is accessible, and is able to be directly communicated with M0 without any need for buffering between the SerDes 210 and the resource 208. This tends to generally reduce the latency of the system 200 and removes the buffer 109 from the designs according to various embodiments of the invention.

This is accomplished by the device 202 delaying the training sequence that is sent to the device 206, based upon the schedule of the resource 208. In some instances, no delay is required to achieve resource-synchronization, because the data will arrive at the proper time once training is complete, according to the scheduler 302. In some instances, a delay of one cycle is added to the transmission of the training sequence by the device 202, so that the data will arrive at the device 206 at the proper time once training is complete. In other instances, a delay of two cycles is added, and so forth, depending on the partition of the resource desired. Because this variable delay is predictable according to the scheduler 302, the device 202 can send the data to the device 206 just in time for access to the resource 208. Thus, the SerDes 210 and the resource synchronizer 212 combine to form a device 206 that reduces latency in the communication of data.

Once the data lanes are all aligned, their associated sync words will appear at a consistent time and place within the 128 characters of a transmit sequence, in accordance with one embodiment. A data link 204 is considered to be properly synchronized when all its sync words appear at the output in exactly the same cycle (where a cycle is a ten-unit interval period). At that point, the SerDes 210 (e.g., the global state machine) computes the difference between the aligned sync words and an alignment counter, which difference is called the sync offset. Offset means how far a sync word is away from the sync target. The sync offset represents the offset between the aligned sync words transmitted from the ASIC 202 to a desired internal alignment in device 206. The sync offsets are communicated back to the ASIC 202 independently over the system on a chip 206 outgoing training pattern using a sync offset field in a command/status word.

The device 206 communicates the degree of offset to the ASIC 202 on a data link 204 (e.g., an outgoing link). If the sync word location is not in a preferred position, then the system on a chip 206 will communicate the offset to each ASIC 202 during each training sequence. In FIG. 2, the system on a chip 206 signals the ASIC 202*a* that an offset of fifty cycles (for example) is needed to synchronize the sync word, and signals to ASIC 202*b* that an offset of thirty cycles (for example) is needed for synchronization. Each ASIC 202 has a data link 204 that in one embodiment contains a link in one direction for transferring control information, and another link in the opposite direction for transferring data.

Upon receiving their respective sync offsets, each ASIC 202 stalls at the end of any one of its transmit training sequences for the specified amount of time before resuming the transmission of its training sequence. Having stalled this one time, the ASIC 202 does not stall again unless and until it receives an updated sync offset that requests another stall of a specified duration, which is used to further tune the synchronization. A system implementing a timeout may be used such that if the sync offset does not change for some number of training sequences the ASIC 202 will again redo the stall at the end of a training sequence. The minimum number of training sequences before the timeout occurs is variable. However, in one embodiment sixteen complete training sequences is a sufficient delay before the ASIC 202 makes further adjustments in response to a sync offset.

When all of the data lanes of the data link 204 have been synchronized to the slowest data lane within a desired degree of synchronization, data lane alignment has been achieved, and the deskew buffers have been adjusted to meet the sync target. Next, the transmission sequence on transmitting device 202 is adjusted to access the internal resources 208 of the device 206. Once the ASIC 202 has completed the adjustments of the appropriate lanes, the sync offset for the link is zero. Accordingly, the timing of the training sequence has been aligned to the system on a chip 206 internal scheduler 302. The first data frame sent after the end of the training sequence will have the correct timing to access the device 206 resources 208. In the case of the system on a chip 206, this could be an access to a single partition in the memory 208 with minimum latency.

The transmitter delays sending a sync word for a given number of cycles and then sends a sync word with all of the data lanes in the data link 204 appropriately timed for a specific partition of the memory 208. Specifically, the ASIC 202 knows the right time to launch a data frame so that it reaches the desired memory partition while memory latency is reduced. In the present embodiment, the sync offset for the link is zero for partition M0, though any portion of resource can be used for timing, so long as it is used consistently on all devices communicating to device 206.

The prior art approach is to temporarily hold the request in a buffer 109. However, such buffers 109 lead to an increase in latency and delay the output of such data or commands until the resource 108 is ready to receive them. Aligning a memory access request to the partitions of the scheduler 302 makes it unnecessary to hold the request or data in a buffer 109. As a result, latency is reduced in embodiments of the present invention by using the scheduler 302 to schedule accesses to the memory 208.

Figure 4:
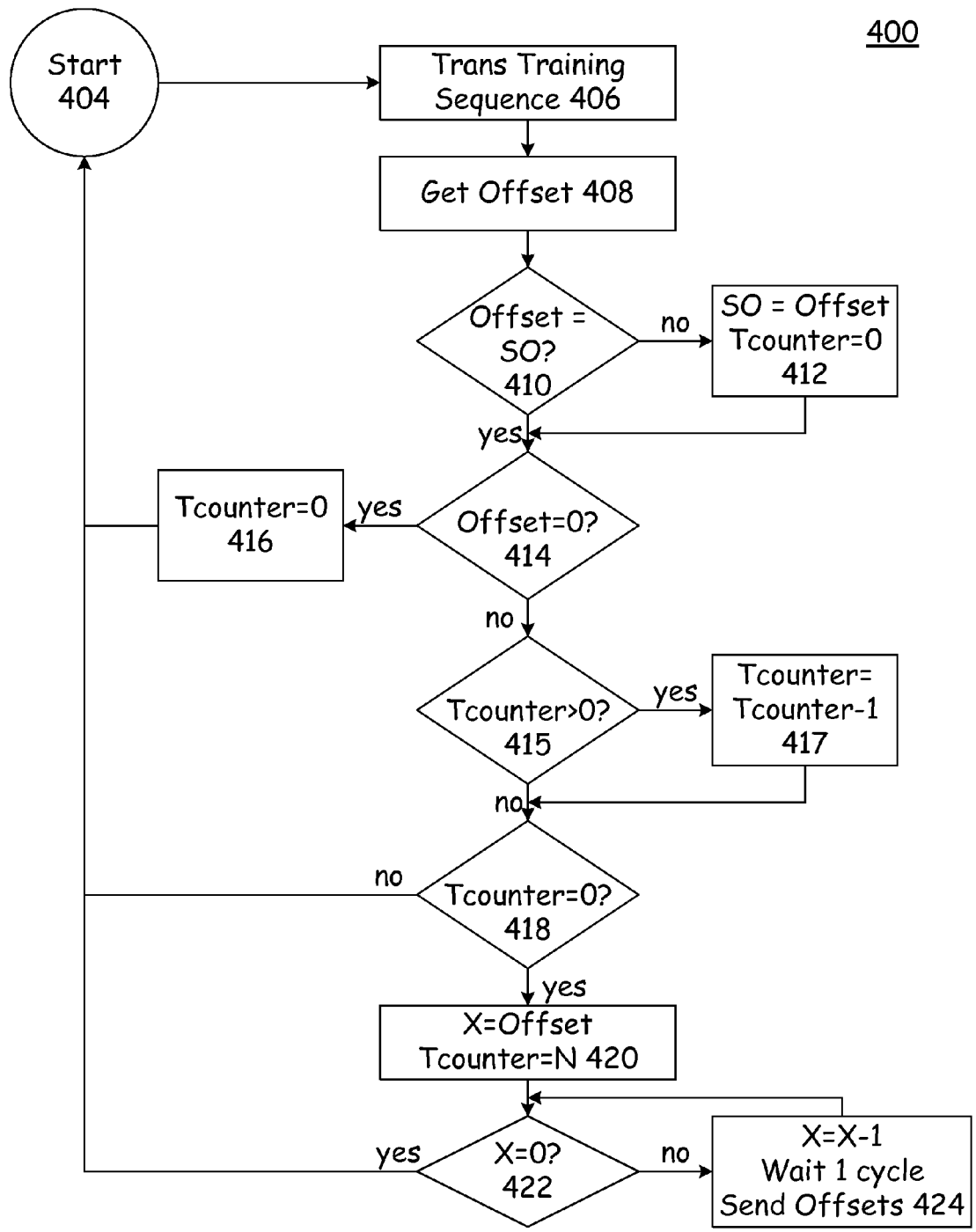
FIG. 4 is a detailed flow chart of a method according to an embodiment of the present invention.

The flowchart of FIG. 4 depicts one embodiment 400 for adjusting the lanes of an interface link 104. At reset/start step 404, a timeout counter is set to zero and communication over the data link 204 begins. The device 202 transmitter begins to concurrently transmit a complete training sequence across each lane of the link 204 to the device 206 receiver, as given in step 406. In step 408, the device 206 transmitter requests the device 202 to delay the training sequence by sending offset information embedded in the command status to the device 202.

Concurrently, the device 206 transmitter begins to periodically send training patterns, including offset information, to the device 202 receiver, such as every 128 cycles (a training sequence). The device 206 transmitter repeatedly notifies the device 202 receiver to adjust the offset for various lanes of the link 204, even after the device 202 transmitter has performed the initially requested adjustment. Thereafter, the device 202 is unaware whether an offset received from the device 206 is still valid. To remedy this uncertainty, the current offset is compared to a saved copy of the offset as given in step 410. If the values are different, then the timeout counter is cleared, as given in step 412. Also in step 412, the saved offset (SO) is updated with the offset received from the device 206.

Next, the device 202 transmitter checks at step 414 if the link offset received on its receiver from device 206 transmitter is zero. If the link offset is zero, then no further adjustment is needed, the counter is reset to zero as given in step 416, and the next sync word is transmitted over multiple data lanes. On the other hand, if at step 414 the link offset is not zero, then programming of the data lane alignments proceeds to step 415. In step 415, the timeout counter is evaluated. If the timeout counter is greater than zero, then the timeout counter is decremented by one as given in step 417, and flow proceeds to step 418.

In step 418, the device 202 determines when a data lane adjustment was recently completed by checking whether the counter is zero. A non-zero value indicates that a data lane adjustment was recently completed. However, if the value of the timeout counter is zero, then flow proceeds to step 420, and the counter is set to N to track how often an adjustment request is transmitted.

To enable a device 202 to distinguish between a valid request and an invalid request, the timeout counter is programmed to disregard the same request that is repeated up to N number of times, such as N=16. In step 420, X represents the actual offset value of the lane being trained. Specifically, X is the number of cycles that a lane must wait before the lane is adjusted. In summary, the counter indicates how long ago a lane timing adjustment occurred for which the sync offset has remained the same. Therefore, step 418 remedies the confusion caused by the delays of the device 202 in processing the command status received in step 408.

Then in step 422, if X=0, no further lane adjustment is needed and a new sync word is transmitted. Thus, when the counter is at zero, after counting down from sixteen (the timeout value in this embodiment), and the device 202 receiver is still receiving the same offset adjustment request, the system determines that the adjustment request is valid and makes the lane adjustment that is being received. If X does not equal zero, then in step 424 the device 206 waits one cycle, and decrements the X value, which continues until X equals zero. At that point, the lane is adjusted, and a new sync word is transmitted.

If the desired offset was not properly completed, the next valid offset will try to correct that situation. For example, if the system executed a fifteen-cycle offset, instead of a sixteen-cycle offset, then the next command in FIG. 4 will try to correct the error. That is, a new command requesting an offset of one would be issued.

Figure 5:
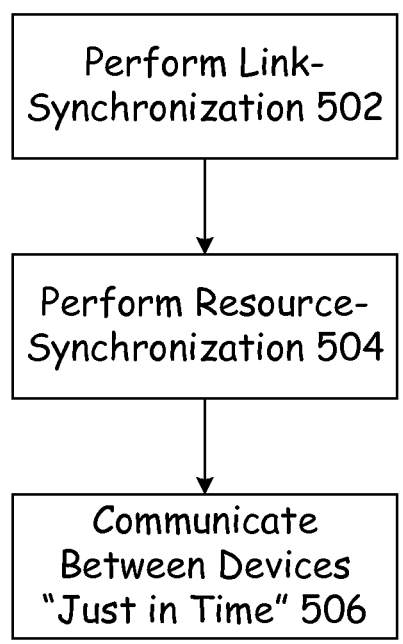
FIG. 5 is a high-level flow chart of a method according to an embodiment of the present invention.

The flowchart of FIG. 5 depicts a high-level outline of a method 500 according to the present invention. According to the method 500, link-synchronization is performed, as given in step 502. Resource-synchronization is also performed, as given in step 504, where the information embodied by the scheduler 302 is communicated to the devices 202. Communication between the devices 202 and 206 is then accomplished in a just-in-time manner, as given in step 506, where the devices 202 performs a variable delay, depending upon the access schedule to the training sequence that is transmitted (such as by using the global state machine), so that it arrives at the resource 208 at a time such that commands transmitted can directly access the resource 208, without any need for buffering.

The synchronization as described above can be performed according to a schedule based upon one or more criteria. For example, in one embodiment the synchronization is performed upon every power-up of the system, or when a new device 202 is attached to a resource device 206. In some embodiments, the synchronization is performed at standard time intervals, to account for any drift that might have occurred during that period. In some embodiments, the synchronization is performed whenever an environmental change is detected, such as a given rise or fall in temperature of the system. In some embodiments, the synchronization is performed when data flow changes to some predetermined degree from that at which the system was last synchronized. In some embodiments, the synchronization is performed only when a synchronization deterioration of some given level is determined by the system.

Figure 6:
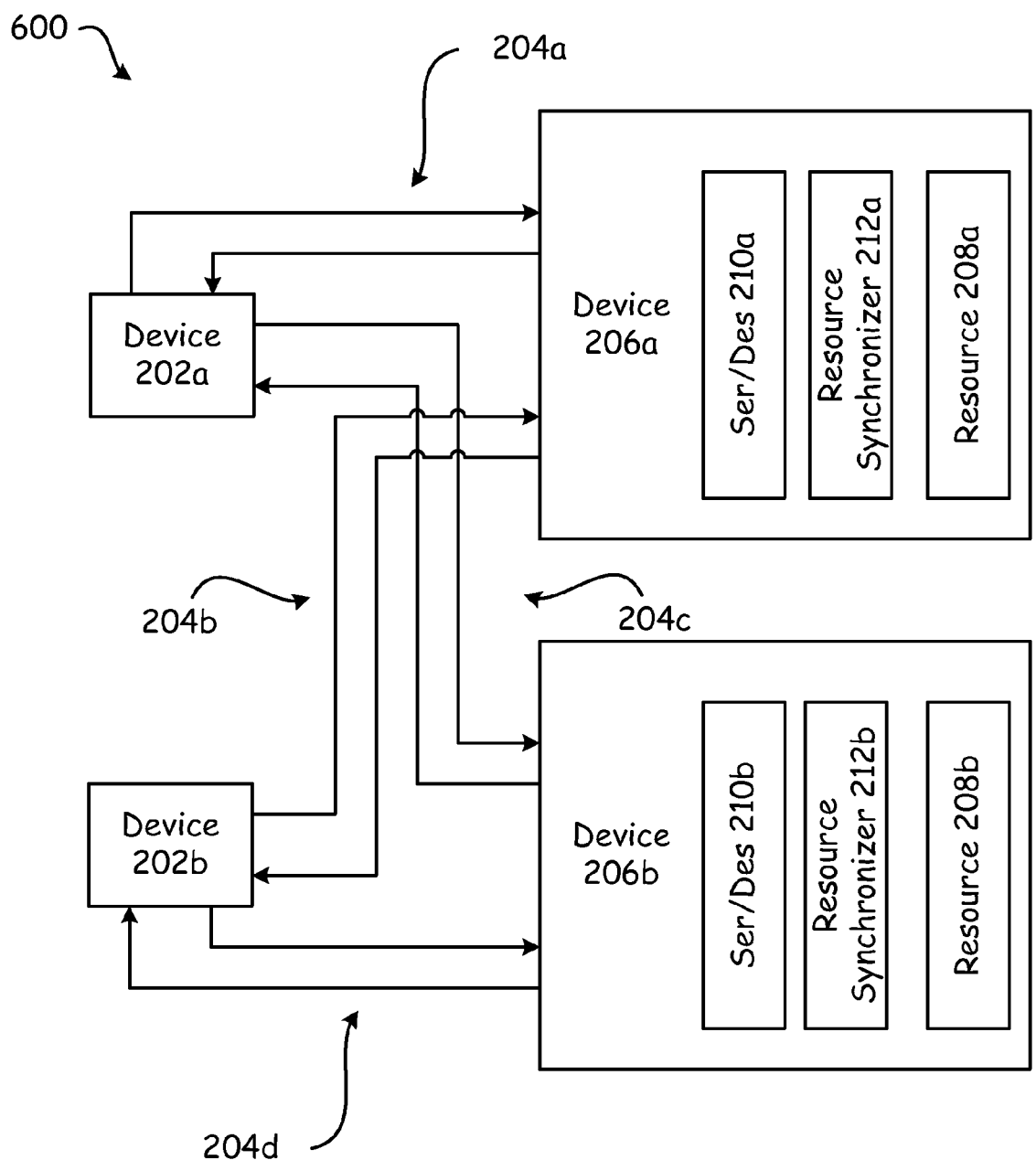
FIG. 6 is a functional block diagram of an electronic communication system, according to another embodiment of the present invention.

With reference now to FIG. 6, there is depicted an electronic communication system 600, according to an embodiment of the present invention, where multiple devices 202 communicate over communication links 204 with multiple devices 206. In such embodiments, each of the devices 202a and 202b (e.g., transmitters) is independently trained for link-synchronization and resource-synchronization for each of the devices 206a and 206b (e.g., receivers).

Many of the examples above have referred to the resource 208 being a memory. However, as mentioned above, the basic elements of the embodiments of the present invention are just as applicable to other devices or situations. For example, instead of accessing memory partitions in rotation as they are available, a device 202 might access the available functions of a device 206 in rotation, or different resources 208 within the device 206.

Figure 7:
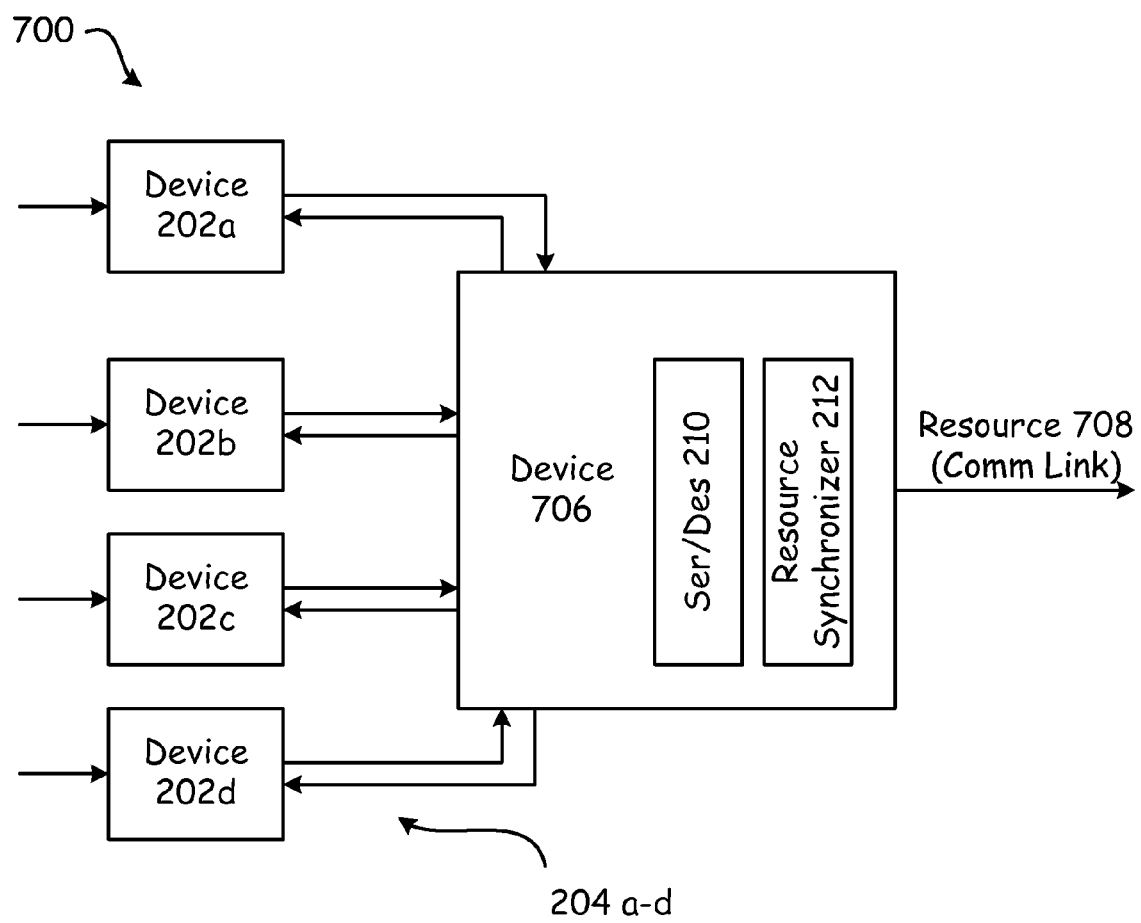
FIG. 7 is a functional block diagram of an electronic communication system, according to an embodiment of the present invention.

As depicted in FIG. 7, other embodiments of the electronic communication system 700 comprehend merging data streams from two or more data links 204 onto a common data bus (resource 708 would in those embodiments represent a bus instead of a device), where such synchronization and timing of the multiple data streams better utilizes the capacity of the common data bus 708, and thus decreases the latency associated with the data bus. SerDes 210 and resource synchronizer 212 provide the scheduling function to ensure lower latency between transmission of data from devices 202a through 202d on links 204a-204d onto common data bus resource 708.

Figure 8:
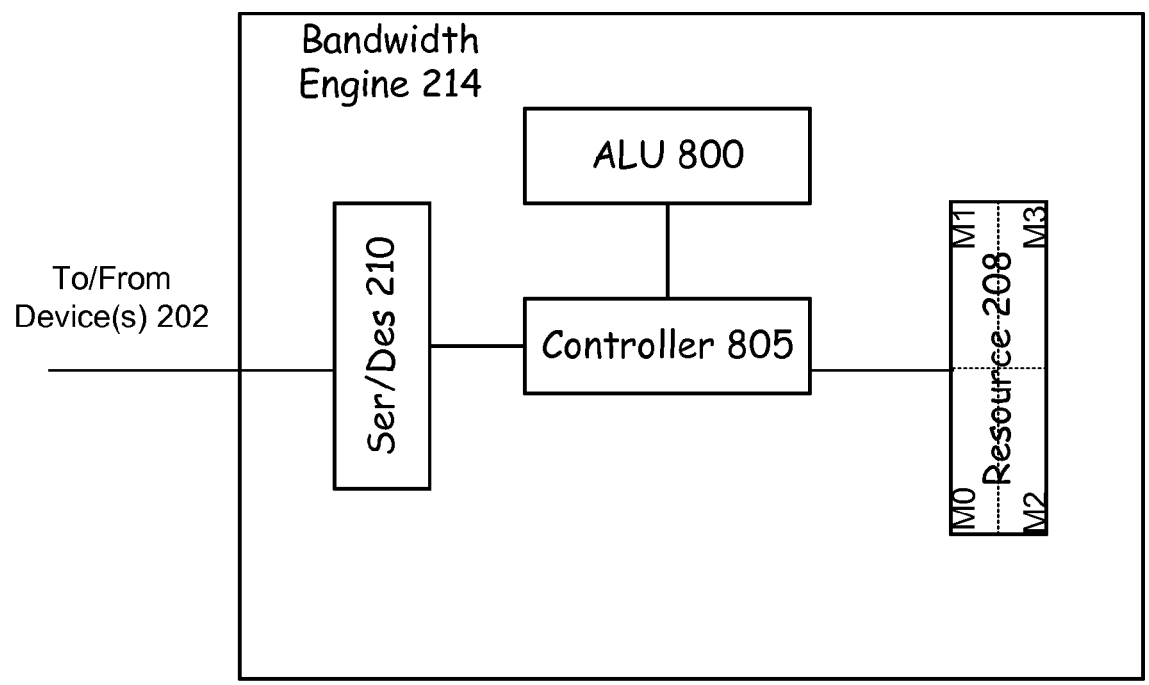
FIG. 8 is a block diagram of a bandwidth engine, according to an embodiment of the present invention.

FIG. 8 depicts a bandwidth engine 214 version of a device, according to an embodiment of the present invention. The bandwidth engine 214 includes an arithmetic logic unit (ALU) 800 coupled to a controller 805 and a serializer-deserializer 210. The controller 805 is coupled (e.g., connected) to the arithmetic logic unit 800, the serializer-deserializer 210, and the resource 208. In this embodiment, the controller 805 performs the functions of the resource synchronizer 212. In various embodiments, the controller 805 performs some or all of the steps of the methods 400 and 500.

The arithmetic logic unit 800 performs mathematical functions for manipulating (e.g., modifying or moving) data. For example, the resource 208 may be a memory and the arithmetic logic unit 800 may perform addition and subtraction on a storage location in the resource 208. In some embodiments, the arithmetic logic unit 800 is optional. In embodiments including the arithmetic logic unit 800, the arithmetic logic unit 800 reduces the work load on the device 202. The arithmetic logic unit 800 may be any type of system or device for manipulating data. For example, the arithmetic logic unit 800 may include a combinational logic circuit, a sequential logic circuit, a computing processor, or the like, or some combination thereof.

An example, resource 208 is a hierarchical multi-bank multi-port memory system. The access schedule indicates on which cycles of the clock signal the partitions of memory 208 are accessible, for example to read data from the memory 208 or write data to the memory 208. In various embodiments, the memory 208 includes partitions (e.g., memory blocks), shown as partitions M0-M3, some of which are accessible on different cycles of the clock signal. For example, partitions of the memory 208 may be accessible during corresponding cycles of a sequence of cycles of the clock signal. Moreover, the access schedule may be cyclical such that the sequence of cycles repeats. For example, a partition of the memory 208 may be accessible during a cycle of the clock signal (i.e., an entry point for access) and inaccessible for the next N cycles of the clock signal after which the pattern of access to the partition of the memory 208 repeats. Further, in this example, only one partition of the memory 208 is accessible in a given cycle of the clock signal. In other embodiments, some but not all of the partitions of the memory are accessible in a given cycle of the clock signal.

More detail on the hierarchical multi-bank multi-port memory system is provided in commonly owned U.S. patent application Ser. No. 12/697,150, now U.S. Pat. No. 8,547,774, entitled Hierarchical Multi-Bank Multi-Port Memory Organization, issued on Oct. 1, 2013, which is incorporated by reference herein in its entirety. Another example of the memory 208 is the high utilization multi-partitioned serial memory described in commonly owned U.S. patent application Ser. No. 12/697,141, entitled High Utilization Multi-Partitioned Serial Memory, filed on Jan. 29, 2010, which is incorporated by reference herein in its entirety.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of resource-synchronizing data transmitted on a communication link between a first device and a second device, the communication link having at least one data lane, wherein the second device has a SerDes coupled to a hardware resource that is accessible based on an access schedule, the method comprising:
    determining a timing offset at which cycle the hardware resource is available in the second device based on the access schedule of the hardware resource in the second device;
    communicating the timing offset to the first device, and
    delaying transmission of data from the first device to the second device through the communication link by the timing offset so that the data is received at the hardware resource when the hardware resource is accessible according to the access schedule; and wherein:
        the hardware resource of the second device is inaccessible outside of the access schedule;
        the access schedule indicates entry points for accessing individual portions of the hardware resource of the second device;
        the access schedule is a cyclical schedule for the individual portions of the hardware resource in the second device, and wherein both the first device and the second device are synchronized to the schedule; and
        the timing offset for transmission of data from the first device to the SerDes of the second device is determined so that the SerDes of the second device is capable of forwarding the data to the hardware resource according to the access schedule without a need for buffering the data between the SerDes of the second device and the hardware resource of the second device.

2. The method of claim 1, wherein the communication link is a multi-lane communication link, and link-synchronization is performed prior to the resource-synchronization.

3. The method of claim 1, wherein the access schedule of the hardware resource in the second device is programmable.

4. The method of claim 1, wherein the access schedule provides a repeating access pattern for the hardware resource of the second device.

5. The method of claim 1, wherein the access schedule is a repeating sequence that indicates when the hardware resource is available for access.

6. The method of claim 1, wherein a scheduler in the first device schedules the transmissions of data from the first device to the second device according to the access schedule of the hardware resource of the second device.

7. The method of claim 1, wherein the timing offset is a predictable delay based on the access schedule for the individual portions of the hardware resource in the second device, and wherein both the first device and the second device are synchronized to the cyclical schedule.

8. The method of claim 1, wherein the hardware resource is a memory.

9. The method of claim 1, wherein the access schedule is a fixed access schedule.

10. An apparatus comprising:
    a memory that is accessible based on an access schedule;
    a SerDes coupled to the memory; and
    a resource synchronizer; and wherein the apparatus is configured to:
        determine a timing offset at which cycle the memory is available in the apparatus based on the access schedule of the memory;
        communicate the timing offset to another device;
        receive a delayed transmission of data from the other device through a communication link with the timing offset so that the data is received at the memory when the memory is accessible according to the access schedule; and wherein:

the memory is inaccessible outside of the access schedule;

the access schedule indicates entry points for accessing individual portions of the memory of the apparatus;

the access schedule is a cyclical schedule for the individual portions of the memory in the apparatus, and wherein both the other device and the apparatus are synchronized to the cyclical schedule; and the timing offset for transmission of data from the other device to the SerDes of the apparatus is determined so that the SerDes of the apparatus is capable of forwarding the data to the memory according to the access schedule without a need for buffering the data between the SerDes of the apparatus and the memory of the apparatus.

11. The apparatus of claim 10, wherein the memory includes a plurality of portions each of which is accessible at different times according to the access schedule.

12. The apparatus of claim 10, wherein the resource-synchronizer includes a scheduler for maintaining a plurality of partitions each corresponding to a portion of the memory.

13. The apparatus of claim 10, wherein the access schedule is a fixed access schedule based on a fixed cycle of availability of the portions of memory.

14. An electronic communication system, comprising:

a first device for communicating information; and a second device coupled to the first device via a communication link, wherein the second device comprises:

a hardware resource that is accessible based on an access schedule;

a SerDes coupled to the hardware resource; and a resource synchronizer; and wherein the second device is configured to:

determine a timing offset at which cycle the hardware resource is available in the second device based on the access schedule of the hardware resource;

communicate the timing offset to the first device;

receive a delayed transmission of data from the first device through the communication link with the timing offset so that the data is received at the hardware resource when the hardware resource is accessible according to the access schedule; and wherein:

the hardware resource is inaccessible outside of the access schedule;

the access schedule indicates entry points for accessing individual portions of the hardware resource of the second device;

the access schedule is a cyclical schedule for the individual portions of the hardware resource in the second device, and wherein both the first device and the second device are synchronized to the cyclical schedule; and the timing offset for transmission of data from the first device to the SerDes of the second device is determined so that the SerDes of the second device is capable of forwarding the data to the hardware resource according to the access schedule without a need for buffering the data between the SerDes of the second device and the hardware resource of the second device.

15. The electronic communication system of claim 14, wherein the first device includes a scheduler configured to schedule transmission of data from the first device to the second device according to the access schedule.

16. The electronic communication system of claim 14, wherein the second device communicates an offset to the first device for synchronizing the first device with the hardware resource on the second device based on the access schedule of the hardware resource.

17. The electronic communication system of claim 14 further comprising:

a plurality of first devices coupled to the second device; and wherein the hardware resource of the second device is divided into partitions, each accessible according to the access schedule, and wherein the second device is configured to determine respective offsets for each link to the hardware resource based on the access schedule and communicate the offsets to the plurality of first devices.

18. The electronic communication system of claim 14, wherein the hardware resource of the second device is shared by a plurality of first devices, and the access schedules communicated in parallel to the plurality of first devices, and respective offsets are sent to the plurality of first devices.

19. The electronic communication system of claim 14, wherein the access schedule is a fixed access schedule.

20. The apparatus of claim 10, wherein:

the timing offset is a quantity of cycles between zero and multiple cycles based upon the schedule of the memory.

* * * * *